A. M. MAYER.
Topophone.
No. 224,199. Patented Feb. 3, 1880.
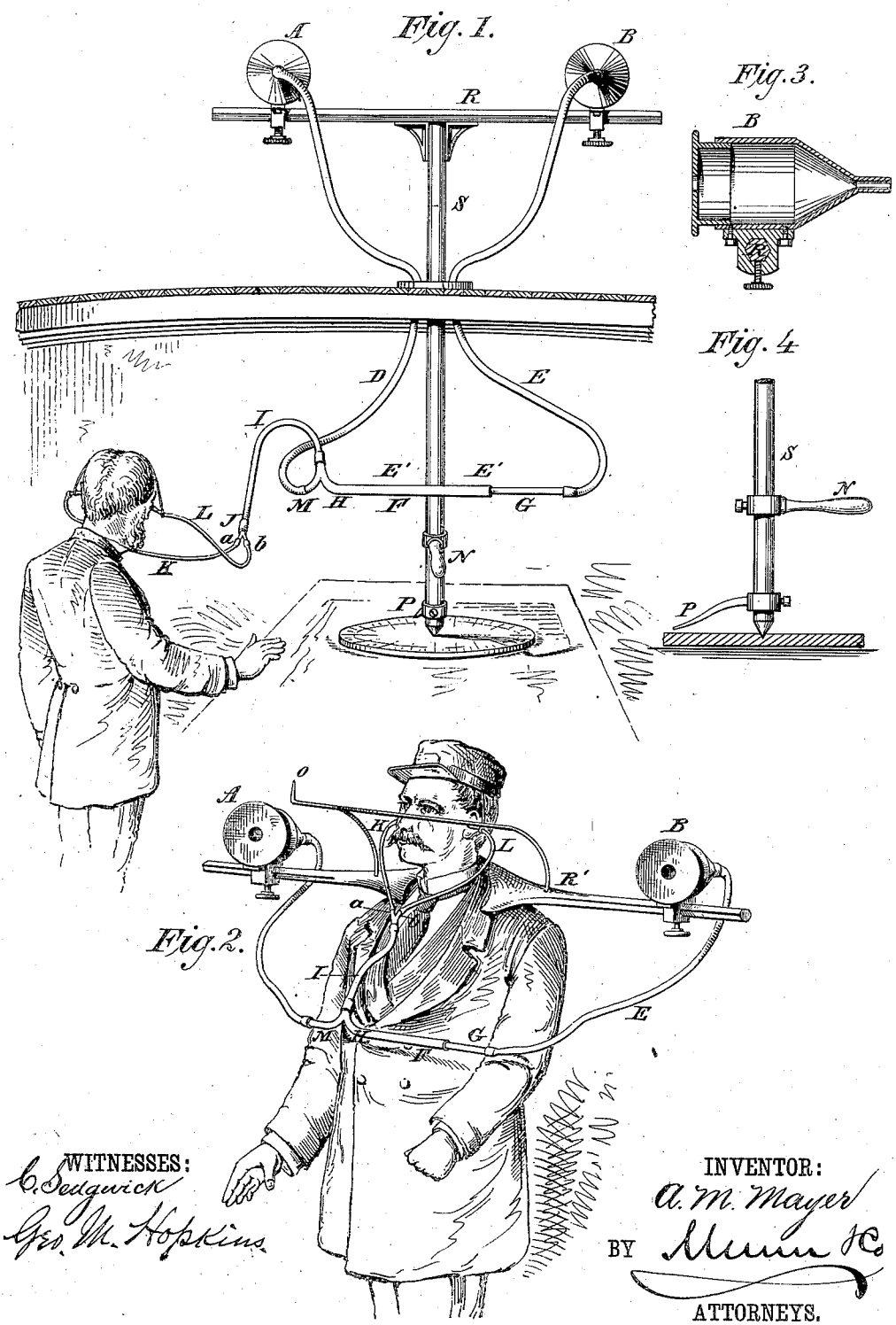

UNITED STATES PATENT OFFICE.

ALFRED M. MAYER, OF SOUTH ORANGE, NEW JERSEY.

TOPOPHONE.

SPECIFICATION forming part of Letters Patent No. 224,199, dated February 3, 1880.

Application filed September 30, 1879.

*To all whom it may concern:*

Be it known that I, ALFRED M. MAYER, of South Orange, New Jersey, have invented certain Improvements in Topophones, of which the following is a specification.

My improvements relate to a method of and apparatus for determining the direction relatively to the point of observation of a sound-producing instrumentality, and hence, by a series of observations conducted at two or more different points upon the same base-line, affording the data necessary for determining the distance of the sound-producing instrumentality from the place of observation; and my invention consists, broadly, in the application to the same sound-wave surface of two resonators, tuned to the pitch of the sound under observation, and fixed at a distance from each other somewhat less than the length of the wave of such sound, and connected by means of tubes to a single pipe, to which the tubes conduct the sound-vibrations collected by the resonators, and by which such vibrations are conducted to the ear of the observer, whereby, when the connecting or confluent tubes are alike in length, the sound so collected from the same wave-surface and conducted to the ear of the observer is augmented in intensity; or, on the other hand, when the connecting-tubes are relatively varied in length, the sound so collected and conducted to the ear of the observer is diminished in intensity, by reason of the greater or less degree of interference of the sound-vibrations, such interference being greatest when the relative difference in the lengths of the connecting-tubes amounts to or includes a length equal to one-half the wave-length of the sound. As such augmentation or diminution in the intensity of the sound is only manifested when the mouths of both resonators touch, or nearly touch, the same sound-wave surface, and as the sound-wave surface is substantially a sphere at the center of which the sound is produced, it follows that when both resonators touch the same sound-wave surface a line drawn from the mouth of one resonator to the mouth of the other is a chord of the sphere, and that a line perpendicular thereto is a radius of the sphere, or, in other words, coincides in alignment with a line drawn from the place where the sound is produced through the place of observation. By moving a measured distance laterally at an observed angle from the radius-line thus found a second radius-line may in like manner be found. The distance between the two points of observation is the base-line of a triangle of which the two convergent radius-lines are the sides. The length of this base-line and the observed angles therewith of the two radius-lines constitute sufficient data for the computation by familiar processes of the length of the two sides of the triangle, or the distance of their point of junction, and hence the distance of the sound-producing instrumentality from the place of observation.

I call my apparatus the "topophone," and my invention incidentally includes means of adjusting the two resonators at variable distances from each other, means of varying the lengths of one or both of the connecting-tubes, a suitable frame for the support of the various parts of the apparatus, affording an axis of oscillation which is substantially perpendicular to a line drawn from one resonator to the other, and a pointer which is substantially perpendicular to the axis of oscillation and to a line drawn from one resonator to the other.

My invention may be employed either upon land or water; but its principal object is to facilitate the safe navigation of a vessel in a fog. In the latter case a base-line is obtainable by sailing the vessel an observed distance in a straight line from one point of observation to the other.

My topophone may either be permanently erected upon a vessel or other structure, or it may be made in portable form, as will be seen on reference to the accompanying drawings, in which—

Figure 1 is a side elevation, showing the manner of erecting the topophone upon a vessel or other structure. Fig. 2 is a perspective view of a portable topophone. Fig. 3 is a central longitudinal section of one of the resonators; and Fig. 4 is a representation, in detail, of the lower end of the spindle, which constitutes the axis of oscillation for the apparatus.

My apparatus consists of a T-shaped frame composed substantially of the shaft S, to one end of which the cross-bar R is centrally attached.

Two resonators, A and B, are each supported transversely upon the bar R by means of a sliding connection, so that they may be respectively adjusted equidistantly from the shaft S and at variable distances from each other. The resonators are of the usual telescopic construction, and are tuned in the ordinary manner by sliding in and out the telescopic joints, or by varying the area of their mouths.

The shaft S has attached to it a handle, N, and a pointer, P, the latter arranged to move over a divided circle, which in some cases may be connected with or form a part of a mariner's compass.

Sound-vibrations received in the mouth of the resonator A are conducted through the preferably flexible tube D to one of the branches M of the pipe I. The opposite branch, H, of the tube I receives vibrations collected by the resonator B through the longitudinally-adjustable tube E E', provided with the telescopic joints F and G, by which it is made capable of being lengthened or shortened by sliding the tube G in or out of the tube F. The opposite end of the pipe I is also branched, and two flexible tubes, L and K, are connected, respectively, with the branches $a$ and $b$, for the purpose of conducting the vibrations simultaneously to both ears of the listener or observer.

When my apparatus is constructed in portable form the bar upon which the resonators are supported is adapted to fit the shoulders, back, or some other part of the person of the observer, as illustrated in Fig. 2, on reference to which it will be seen that the pointer or index O is secured to the bar R', which extends in front of the median line on the face of the observer, to serve as an index to the direction of the sound.

In using my topophone the resonators are first tuned to the pitch of the sound to be observed. This is effected by sliding the telescopic joints of the resonators in or out in the usual manner until the normal pitch of the sound resonator corresponds to the pitch of the sound to be observed. The resonators are then adjusted equidistantly from the shaft S at a distance from each other slightly less than the wave-length of the sound to be observed.

When the apparatus is to be used to augment the intensity of the sound under observation the telescopic joint of the conducting-tube E E' is adjusted until the tube E E' is of equal length with the tube D, or until the length of the adjustable tube E E' does not differ from the length of the tube D by any fractional part of a wave-length of the sound under observation. The shaft S, being then held in an upright position, is slowly rotated upon its longitudinal axis until the mouths of both resonators touch the same sound-wave surface. The observer, having the ends of the tubes L and K applied to his ears, will perceive a sudden augmentation in the intensity of the sound when the mouths of both resonators touch, or nearly touch, the sound-wave surface. The position of the pointer then coincides in alignment with a line drawn from the source of sound through the place of observation.

For the purpose of verifying the result thus obtained the mode of observation may be changed by sliding together the telescopic tubes F and G until the conducting-tube E E' is diminished in length to an amount equal to half the wave-length of the sound under observation. Then, upon rotating the apparatus as before, at the instant when the mouths of the resonators touch, or nearly touch, the same sound-wave surface, there will be a diminution in the intensity of the sound heard by the observer, owing to a greater or less interference of the sound-waves in the pipe I. At the instant when this diminution in the intensity of the sound is observed the pointer will also coincide in alignment with a line drawn from the sound-producing instrumentality through the place of observation. It will, of course, be understood that either form of observation may be repeated with the resonators adjusted at variable distances from each other.

If desired, several pairs of resonators may be arranged upon the same frame, one pair above the other; but ordinarily I prefer one pair only.

I do not limit myself to the exact form of constructing my apparatus shown in the drawings, as my invention may be embodied in various forms, and is present in any structure in which a pair of resonators provided with ear-tubes are supported in a position substantially parallel to each other, so that their mouths can be conveniently applied to the same sound-wave surface, and a line drawn from the mouth of one resonator to the other will be susceptible of observation as a chord of the sound-sphere; nor do I limit myself to any particular kind of resonators or sound-receivers, as in carrying out my invention I may employ resonators or resonant cavities, or ear trumpets or tubes, or boxes, or any other vibrants or sound-receivers capable of acquiring by application to the sound-wave surface like phases of vibration therewith, and reflecting or transmitting such vibrations through confluent tubes to a single pipe or chamber, wherein the vibrations may conspire if the confluent tubes are of equal length, or interfere if the confluent tubes are of unequal length, and thus, as the case may be, either augment or diminish the intensity of the sound transmitted from the pipe to the ear of the observer at the instant when the two sound-receivers simultaneously touch the same sound-wave surface.

I claim as my invention in a topophone, or instrument for determining the direction relatively to the place of observation of a sound-producing instrumentality—

1. The combination, with each other, of two resonators or sound-receivers, respectively provided with ear-tubes, and mounted upon a suitable support, with their mouths in substantially the same plane, substantially as and for the purpose set forth.

2. The combination, with each other, of two suitably-supported ear-tubed resonators or sound-receivers, substantially such as described, with means of adjusting the resonators or sound-receivers at variable distances from each other, substantially as and for the purpose set forth.

3. The combination of two suitably-supported resonators or sound-receivers, provided with confluent tubes, with a single pipe, to which the tubes respectively conduct the vibrations collected by the resonators or sound-receivers, and from which such vibrations are conducted to the ear of the observer, substantially as described.

4. The combination of two resonators or sound-receivers and a single pipe with conducting or confluent tubes connecting the resonators or sound-receivers with the pipe, one or both of which conducting-tubes are longitudinally adjustable, substantially as and for the purposes set forth.

5. The combination of two ear-tubed resonators or sound-receivers with a supporting-frame provided with a pointer, erected thereon in a line perpendicular to a line drawn from one resonator or sound-receiver to the other, substantially as and for the purpose set forth.

6. The combination of two resonators or sound-receivers with a supporting-frame provided with a shaft or axis for facilitating the oscillation of the resonators or sound-receivers upon a common center of motion.

7. In combination with the two resonators or sound-receivers provided with confluent tubes, the adjustable tube E E', composed of the two sections F and G, sliding one upon the other, substantially as described.

8. The combination, in an instrument for determining the direction of sounds, of the resonators or sound-receivers A B, the confluent tubes D and E E', the supporting-bar R, and the shaft or axis S, substantially as and for the purposes set forth.

9. The method herein described of determining the direction relatively to the place of observation of a sound-producing instrumentality by rotating two ear-tubed resonators or sound-receivers about a common axis and observing their position when both resonators or sound-receivers are brought at the same time into position upon the wave-surface of the sound, or bear that relation in position to the position of the wave-surface in which they perceptibly augment or diminish, as the case may be, the intensity of the sound transmitted to the ear of the observer.

ALFRED M. MAYER.

Witnesses:
A. E. BEACH,
C. SEDGWICK.